United States Patent
Moseman (10) Patent No.: US 12,372,329 B2
(45) Date of Patent: Jul. 29, 2025

(54) METHOD FOR CALCULATED AIMPOINT CORRECTION IN A DIGITAL WEAPON SIGHT

(71) Applicant: Samuel Moseman, Orange, CA (US)

(72) Inventor: Samuel Moseman, Orange, CA (US)

(*) Notice: Subject to any disclaimer, the term of this patent is extended or adjusted under 35 U.S.C. 154(b) by 100 days.

(21) Appl. No.: 18/496,857

(22) Filed: Oct. 28, 2023

(65) Prior Publication Data

US 2024/0295386 A1 Sep. 5, 2024

Related U.S. Application Data

(60) Provisional application No. 63/449,979, filed on Mar. 4, 2023.

(51) Int. Cl.
*F41G 3/14* (2006.01)
*F41G 1/38* (2006.01)
*G06T 3/14* (2024.01)

(52) U.S. Cl.
CPC ............... *F41G 3/142* (2013.01); *G06T 3/14* (2024.01); *F41G 1/38* (2013.01)

(58) Field of Classification Search
CPC ............. F41G 3/142; F41G 1/38; G06T 3/14
See application file for complete search history.

(56) References Cited

U.S. PATENT DOCUMENTS

| | | | |
|---|---|---|---|
| 7,738,082 B1* | 6/2010 | Peters | G01C 3/22 356/4.01 |
| 7,905,046 B2* | 3/2011 | Smith, III | F41G 3/06 235/404 |
| 8,833,655 B2* | 9/2014 | McCarty | F41G 1/00 359/422 |
| 9,212,868 B2* | 12/2015 | Roman | F41G 1/54 |
| 10,415,933 B1* | 9/2019 | Kleck | F41G 3/06 |
| 11,391,545 B2* | 7/2022 | Roman | F41G 3/06 |
| 11,994,366 B2* | 5/2024 | Sitrick | F41G 3/02 |
| 12,050,081 B2* | 7/2024 | Roman | F41G 1/44 |
| 2012/0117848 A1* | 5/2012 | Cox | F41G 3/06 42/130 |
| 2024/0377165 A1* | 11/2024 | Bian | G02B 25/001 |

* cited by examiner

Primary Examiner — Michelle Clement (57) ABSTRACT

Systems, devices, and methods are disclosed to correct aimpoint of a system of a weapon and affixed digital weapon sight. The method employs the components of a digital weapon sight configured together for a process of sensing of a ballistic event, storing of digital imagery data before and after a shot or series of shots, and then the performing of an image registration algorithm, via a cross-correlation type function. The image registration determines the misalignment between the images as a Cartesian shift, and aimpoint of subsequent shooting is corrected through application of adjusted reticle symbology or adjusted image sensor windowing. Preprocessing methods for enhancing image registration algorithm accuracy are presented.

5 Claims, 10 Drawing Sheets

E901 Image Gradient Operator: $G_x(I(x,y)) = \frac{d}{dx}(I(x,y))$ ; $G_y = \frac{d}{dy}(I(x,y))$ ; $G_{xy}(I(x,y)) = \sqrt{G_x^2 + G_y^2} \sim I(x,y) - I(x+1, y+1)$

E902 Absolute Directional Gradient Operator (ADG), cardinal method: $G_n(I) = fn\left(\frac{dI}{dy}\right) + gn\left(\frac{dI}{dy}\right)$ $f_0(x) = |a*x|$; $g_0(x) = b*x$; $f_1(x) = b*x$ ; $g_1(x) = a*|x|$;
$f_2(x) = a*|-x|$; $g_2(x) = b*x$; $f_3(x) = b*x$ ; $g_3(x) = a*|-x|$;

$n = 0\ to\ 3$ a, b are constants.
For "Absolute Directional Gradient", $a = 1; b = 0$

E903 Absolute Directional Gradient Operator (ADG), diagonal method:

$G_{x+y+} = \sqrt{G_{x+}^2 + G_{y+}^2}$ where $G_{x+} = \begin{bmatrix} G_x & \text{if } G_x > 0 \\ 0 & else \end{bmatrix}$ $G_{y+} = \begin{bmatrix} G_y & \text{if } G_y > 0 \\ 0 & else \end{bmatrix}$ $G_{x-y-} = \sqrt{G_{x-}^2 + G_{y-}^2}$ where $G_{x-} = \begin{bmatrix} G_x & \text{if } G_x < 0 \\ 0 & else \end{bmatrix}$ $G_{y-} = \begin{bmatrix} G_y & \text{if } G_y < 0 \\ 0 & else \end{bmatrix}$

E904 Multi-Level Gradient Array: $MLD(I(x,y)) = \left[\ I(x,y)\ ;\ \frac{d}{dx}(I(x,y))\ ;\ \frac{d}{dy}(I(x,y))\ ;\ \frac{d^2}{dx^2}(I(x,y))\ ;\ \frac{d^2}{dy^2}(I(x,y))\ ;\ \frac{d^2}{dxy}(I(x,y))\ \right]$

E905 ADG Array: $ADG(I(x,y)) = \left[\ G_{x+}(I(x,y))\ ;\ G_{x-}(I(x,y))\ ;\ G_{y+}(I(x,y))\ ;\ G_{y-}(I(x,y))\ \right]$

E906 ADG Array, Diagonal Method: $ADG(I(x,y)) = \left[\ G_{x+y+}(I(x,y))\ ;\ G_{x+y-}(I(x,y))\ ;\ G_{x-y-}(I(x,y))\ ;\ G_{x-y+}(I(x,y))\ \right]$

METHOD FOR CALCULATED AIMPOINT CORRECTION IN A DIGITAL WEAPON SIGHT

CROSS-REFERENCE TO RELATED APPLICATION

This application claims priority under 35 U.S.C. § 119(e) to U.S. Provisional Patent Application No. 63/449,979, filed Mar. 4, 2023, the disclosure of this prior application is considered part of this application and is hereby incorporated by reference in its entirety.

TECHNICAL FIELD OF THE INVENTION

The present disclosure relates to the technical field of aiming of telescopic weapon sights, and more particularly to the automatic calibration of digital aiming devices for firearms and other weapons systems.

BACKGROUND OF THE INVENTION

Currently, firearms use a wide range of methods to provide a shooter with better aim and higher precision. A common solution is affixing a telescopic sight to a firearm to magnify the target and improve accuracy.

When using a telescopic weapon sight ("sights"/"telescopes"/"scopes"), the first thing a marksman does is a process referred to as "zeroing" the weapon sight to the weapon, and what one can call an "aimpoint correction" step. Typically, a weapon is fitted with a sight via a mounting system such that the sight is rigidly attached to the weapon and positioned in-line with the weapon barrel. Adjustments are made to the sighting device to manipulate the position of lenses within the sight. The marksman then takes a series of careful shots at a target at a certain distance, then re-centers on the target, then manipulates knobs or buttons to move a reticle within the weapon sight's eyepiece display, all to more precisely indicate where a projectile is mean to impact. The marksman then takes another series of shots to confirm the manual manipulation.

In the case of zeroing a digital weapon sight to a weapon: after a shot, the weapon is re-aimed at the initial target, and adjustments are made via a user interface to move a digitally overlayed reticle symbol to the point of impact.

Additionally, a zero of a weapon and weapon sight system is specific to distance. It accounts for windage and bullet drop. After being zeroed at 100 yards, a weapon should have good repeatability in hitting a target at 100 yards. But that same zero will not be useful at 200 yards; bullet drop and added impact of wind on the bullet trajectory will require a zero at 200 yards.

So it is that a fast, effective, hands-free method of zeroing is of great utility.

Digital weapon sights are increasingly common in the military and consumer markets, and have been described in many disclosures, and have been described to use of a variety of sensors (accelerometers, gyroscopes, magnetometers, barometric sensors, microphones) that indicate when shots are fired and store their various data. Despite the assortment of sensors, processors, memories often found in a digital weapon sight, there exists no embedded system or process for digitally aligning the weapon sight and weapon in a fast, hands-free manner and can be deployed in small processors or FPGA's.

It is common for the digital weapon sights to be designed to use low-power processor and memories, and often the processor system is comprised of a small microcontroller and FPGA in communication with each other. The small FPGA, designed to be used for image enhancement and digital overlays, and complex image finding algorithms are very difficult to employ using a resource limited FPGA. This further drives the need for a low-complexity algorithm-based method for digitally zeroing the system.

Such a solution would need to employ common hardware features of a digital weapon sight, be fast and user friendly, be reliable, and be able to be implemented in the small processors and memories found in a weapon sight.

The utility of enhancing the reliability of the aiming of a weapon is well demonstrated by numerous efforts.

US20230079864 (Li) discloses a system where images are saved and analyzed to determine an aiming point. The utility of the claims is described as "relates generally to location recognition." And though the algorithms for template matching may be useful, the keypoint extraction techniques and image registration using a SURF method are too complex to be employed by the small processors that are used digital weapon sights.

U.S. Pat. No. 10,378,857 (Li) uses a method to correct aimpoint by means of affine transformations and perspective corrections, and requires a certain paper target be employed. Given the complexity of calculations and required target, a simpler manner should be employed for smaller, low power devices in a tactical setting.

U.S. Pat. No. 8,651,381 (Rudich) specifies a device that "includes a video camera capable of capturing and tracking the path of a projectile." specifying a system high-speed and high-definition enough "to record and save captured images of the flight of the projectile." This implies power, memory and processing requirements that are not available in nearly any weapon sight system on the market even a decade after the disclosure was made.

None of the above inventions and patents, or others existing, either singly or in combination, is seen to describe the claimed invention herein.

SUMMARY OF THE INVENTION

The disclosure herein relates to an aimpoint correction method by storing digital imagery to memory, analyzing imagery taken before and after a shot, and automatic adjustment of an on-screen reticle.

This disclosure claims a solution for digital weapon sights enabling a quick and highly accurate aimpoint correction method using digital image registration techniques to "zero" a weapon and digital weapon sight system. The digital weapon sight is an assembly of electronic components including an image sensor, a computational unit, herein referred to as "processor," environmental and inertial sensors used to detect that a shot has been fired, and digital memory. A graphical display of imagery data from the image sensor and overlay symbology is most often in common assembly with the other elements, and affixed to the weapon, however it may be remote, as in a helmet-mounted display system, or "heads-up display," or "HUD."

Specific to claims herein, the processor in the digital weapon sight is loaded with executable code or language-defined hardware that conducts a process whereby imagery data is captured and stored into memory immediately preceding a shot, and then again shortly after a shot. These two images are then digitally analyzed to determine where in the first image the shot landed. A reticle, digitally overlayed atop the imagery and nominally centered at the center of the imagery, is then shifted by an offset to indicate where a subsequent shot will land.

In an embodiment, the user enters a mode of operation where imagery data is continuously stored in addressable memory, then the user aims and takes a shot, and on-board sensors sense that ballistic event, triggering the processor to isolate a block of imagery data—the "pre-shot" image, captured at a time preceding the ballistic event—and store it to memory. The user then aims a second time, this time aiming at the point of impact of the first shot. If the user fires another shot or if the user simply holds the weapon steady, on-board sensors trigger a second event, causing the processor to isolate and store a second image—the "post-shot" image. The pre-shot and post-shot imagery data are then passed to an algorithm in the processor in which the second image is registered to the first image. A cross-correlation based approach is employed. In an embodiment, a Gradient Array Operator enhancement that increases algorithm reliability is applied to imagery data collected prior to image registration. The image registration produces an output of an "x,y offset", indicating the place where the post-shot imagery data is found in the pre-shot imagery data, and which is how much the on-screen reticle symbology should be shifted in order to correct for the misalignment of the reticle to the point of impact, so that the next bullet fired will land at the center of the reticle crosshairs. The process corrects the subsequent targeting of the weapon and weapon sight with minimal manual manipulation.

In an alternate embodiment, the method includes a step where post-shot imagery data is captured automatically and without requiring the user to aim at the point of impact. The two sets of imagery data are then firstly registered by a cross-correlation method, and then windowed based on this offset so that a pixel-level difference can be achieved. The maximum value of the difference between the images will be the calculated point of impact, and the location of this in the pre-shot image gives the "x,y offset" to correct an on-screen reticle.

This alternative embodiment includes a fallback: if analysis of the output of the correlation/subtraction does not pass threshold criteria, this process reverts to the aforementioned process, and user is prompted to aim at the point of impact, and post-shot imagery data is collected.

In either case, it is important to note that the method is designed to be used in pretty much any situation where the user can determine the point of impact. It is also important to note that the user only needs to take careful aim single time, that is, at the point of impact.

In terms of algorithms, what is detailed is a digital aimpoint correction method which employs a cross-correlation type image registration process. These methods include Sum of Absolute Differences, Normalized Cross Correlation, and others, which are known to those knowledgeable in the art of image processing, and will be detailed through relevant equations. This type of image registration, as opposed to homography, perspective transformation, or feature-finding methods, is computationally simpler and faster. The computational complexity of perspective transformation methods can vary depending on the number of corresponding points used and the specific algorithm employed. As for feature finding methods, the computational complexity is also high, but these methods have benefit of being rotation and scale invariant. These benefits are of low value, though, in our given situation, as there is no scale between the two images, and rotation can be accounted for by an orientation sensor (e.g., IMU).

With the use of lightweight, low-complexity algorithms the goal of digitally aligning the weapon sight/weapon system (a "zero," to use the nomenclature in the background section of this document) is therefore able to be achieved with minimal user intervention.

DETAILED DESCRIPTION OF EMBODIMENTS

The utility and novel technical solutions of the present invention will be more apparent by describing exemplary embodiments of the invention with reference to the figures provided. It should be appreciated that the specific embodiments described herein are intended to illustrate the present invention through examination of preferred embodiments, and that this detailed description is not intended to limit the present invention.

For clear and precise understanding of the present invention, specific details are described below. Section A will describe the relevant physical elements, Section B will cover embodiments of the aimpoint correction method, and Section C will cover some details of optimizations and alternatives to the embodiments described in Section B, that are logical and relevant to elaborate upon. The present invention includes within its scope all embodiments defined by the claims including alternatives, modifications, and logically equivalent methods and solutions.

A. Physical System Overview

Various embodiments described herein relate to a system of a digital weapon sight 100 and weapon 101. The aimpoint correction method pertains to and utilizes elements of the digital weapon sight described exemplarily here, and as such it is important to identify these elements.

The weapon 101 may be a rifle, gun, shotgun, machine gun, or other firearm.

Fundamental elements of the digital weapon sight 100 are: a housing 200; optics focusing a target to an image sensor 201; an image sensor 202; a computational unit 203, in this section and in claims referred to as the "processor", configured by internal or external non-volatile memory 204 with instructions or configuration data to execute or implement in embedded hardware a series of processes and/or state machines to carry out the aimpoint correction method outlined herein; a ballistic event and orientation sensor 207; addressable digital memory 205 (internal or external to processor 203) sufficiently large to store multiple frames of imagery in the form of dynamic or static RAM; a user interface 208; an imagery output mechanism 210; and electronic power supply 213; and a mounting bracket or rail mount 214 as a manner of affixing the weapon sight housing to a weapon, which may be removable from the weapon sight housing. The wide arrows of FIG. 2 indicate the flow of high-bandwidth imagery data; the fine arrows indicate flow of low bandwidth orientation, ballistic event, and user interface data.

The weapon sight 100 operates by capturing and displaying live video, with reticle symbology 300 overlayed upon imagery.

Figure 2:
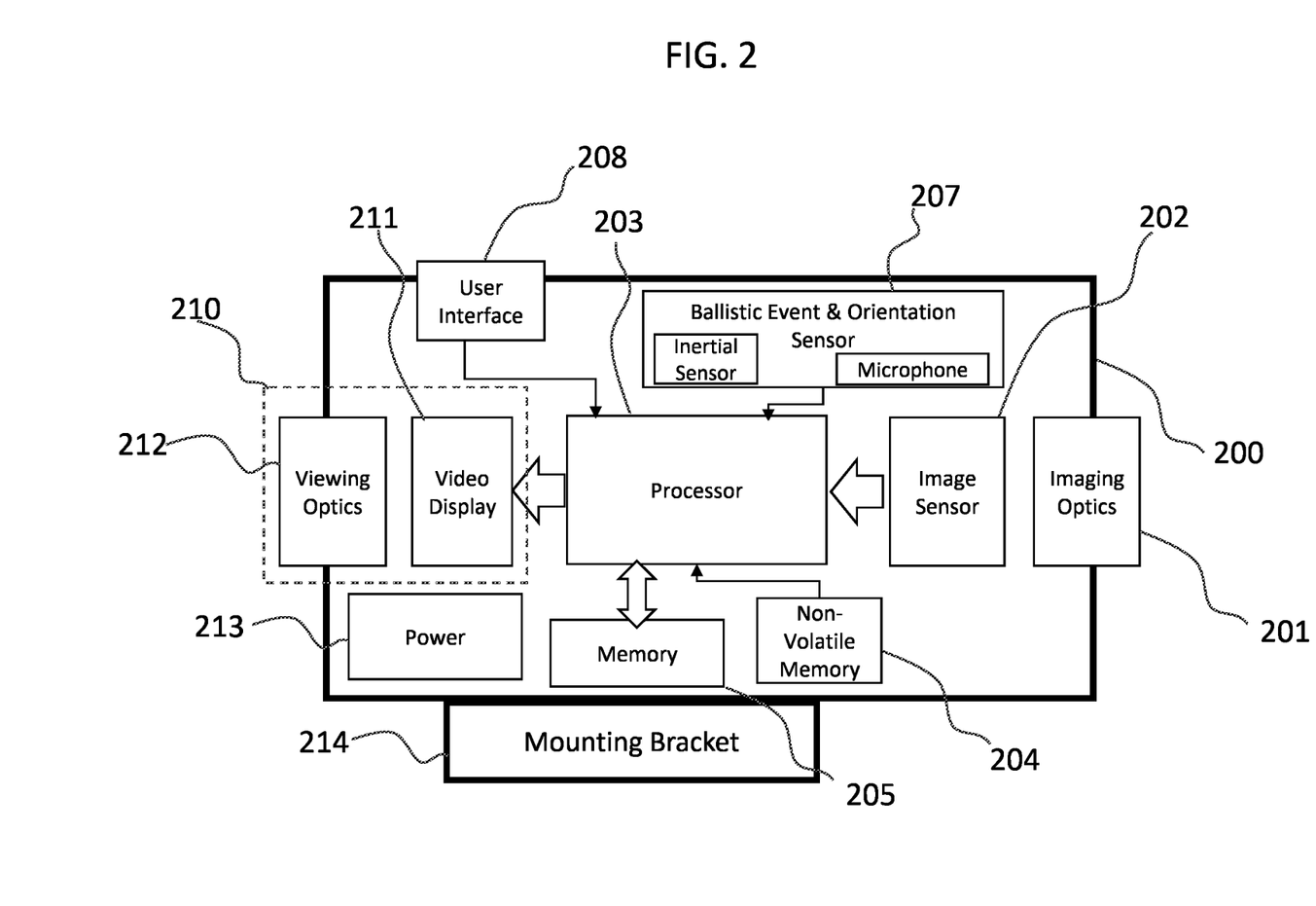
FIG. 2 is a block diagram of a digital weapon sight and its functional components.

The image sensor 202 may be an infrared focal plane array, or a color or monochrome CMOS or CCD image sensor.

The processor 203 may be a microcontroller, microprocessor, or FPGA or other such electronic computation device.

The user interface 208 may be buttons, knobs, keypad, and/or touchscreens. It is through the user interface 208 that the user controls the weapon sight's general function and may enter and terminate the aimpoint correction process.

The ballistic event and orientation sensor system 207 is comprised of at least an accelerometer, though ideally is a 6- or 9-axis accelerometer, and indicates the rotation with respect to gravity of the entire system as well as indicating to the processor 203 that weapon has been fired. To this end it may also include a microphone, in communication with the processor 203, the two configured to determine that a shot has been fired from the weapon 101. It is from 207 that orientation data is collected and saved during the process of aimpoint correction.

The digital memory 205 may be Dynamic RAM such as Low Power DDR (LPDDR) or HyperRAM, SRAM or PseudoSRAM or other such addressable memory. This memory must have sufficient space to store a plurality of imagery data collected and stored during the aimpoint correction process. This memory may also store executable code for the processor.

The power supply 213 may be removable batteries or rechargeable batteries.

The weapon sight has an imagery output mechanism 210, most often comprised of a digital display and imaging optics represented by 211 and 212. Alternatively, the imagery output mechanism may be comprised of a wireless link to an external image rendering system for viewing, e.g. a heads-up display, or connector to an external display system, e.g., a laptop or personal computer.

B. Method Description

Embodiment 1—The Preferred General Case

Figure 5:
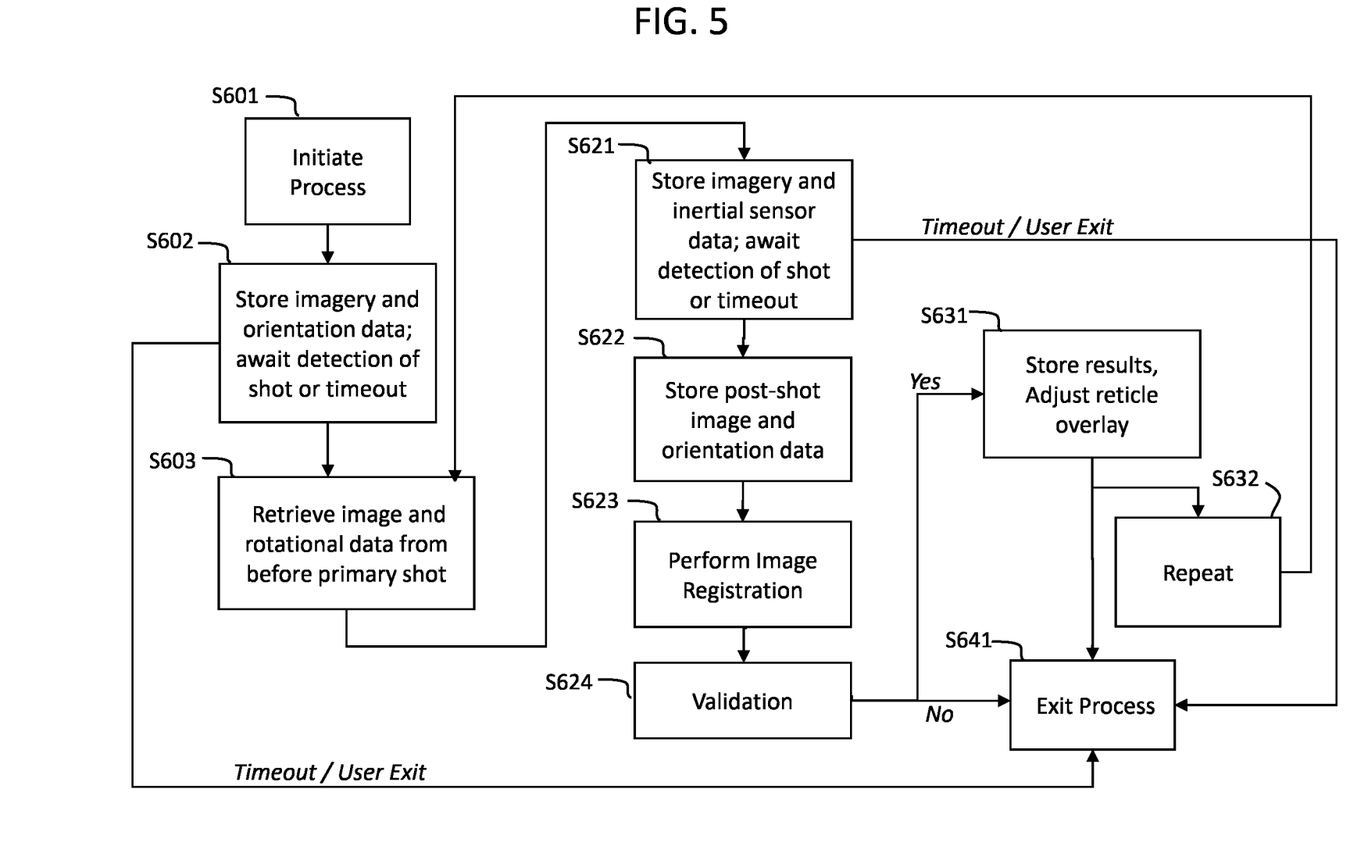
FIG. 5 is a flowchart of the preferred embodiment of the aimpoint correction method.

In the general case embodiment, the aimpoint correction method follows step outlined in FIG. 5. The imagery shown to the user through the imagery output mechanism would, in the preferred embodiment, follow along the lines of exemplary images of FIG. 3. (The images stored and correlated through image registration algorithms in this process will be referred to as $I_1$, for the pre-shot image, and $I_2^R$, for the post-shot image, and $I_2$ for the post-shot image after rotation is applied to match the orientation of $I_1$.)

Figure 3A:
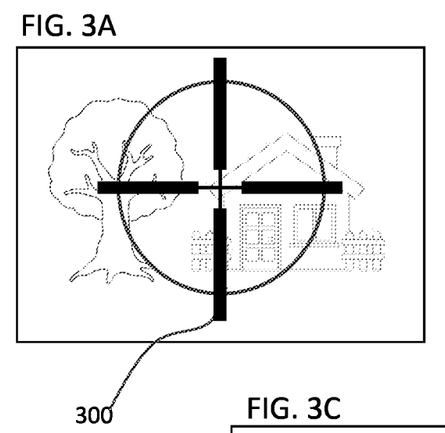
FIG. 3 is a set of exemplary images from the user's point of view during the conduct of the aimpoint correction method according to a preferred embodiment.
Figure 3B:
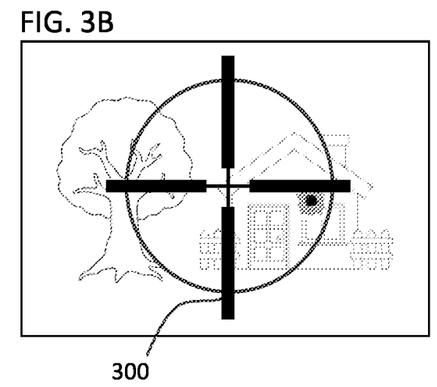

The processor 203, when commanded through user interface, initiates process step S601 wherein imagery data and orientation data is stored within memory 205. The memory interface structure within the processor/memory is optimally a "ring buffer," in which oldest data is overwritten by new data. During this stage, imagery displayed to user via the imagery output mechanism is shown in FIG. 3A. In S602 the processor 203 stores imagery data continuously to memory 205, during which time the user aims and fires a shot. The ballistic event sensor 207 reports to the processor 203 based on its detection of the shot. Subsequently at step S603 the processor 203 isolates in a known memory address at least one entire frame of imagery data $I_1$ and orientation data acquired immediately prior to the initial shot. FIG. 3B shows this stage of the process in notional user view. (When the image sensor is a color sensor array, the imagery data collected in the method may be stored as a grayscale value, achieved by a common equation of Gray=0.299R+0.587G+0.114B, where Gray is the grayscale image value and where R, G, and B are the red, green, and blue component values.)

Figure 3C:
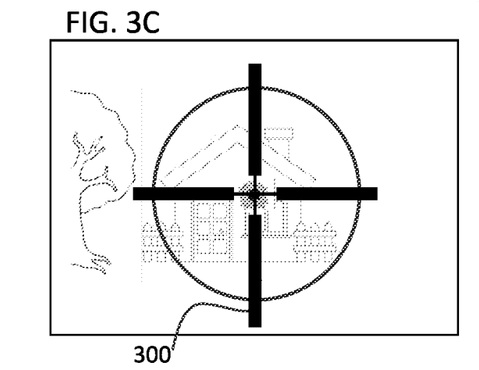

In S621, the user takes aim at the point of impact of the first shot, during which the processor 203 acquires imagery data and ballistic event and orientation sensor data. The processor 203 acquires and saves to memory a second image $I_2^R$ and orientation sensor data in step S622. In S622, depending on the embodiment, the user may fire a second shot, and this ballistic event, detected by the ballistic event and orientation sensor 207, initiates the processor 203 in isolating the second image $I_2^R$, capturing the "post shot" imagery data and orientation data. (The superscript R is meant to indicate that this is image has a different rotation than the pre-shot image). Alternatively, in embodiments with an inertial sensor, inertial sensor may be analyzed to indicate the user is holding the weapon steady for a certain time, and this "steady time" initiates the isolating of the post-shot image $I_2^R$. FIG. 3C shows this stage in notional user view, where the user has adjusted aim to target the point of impact of the first shot.

In any embodiment, the process "times out" and returns to default operation; e.g., if no ballistic event or steady indication is detected during steps S602 or S621 in a preset amount of time, the process is aborted, going back to normal user operation.

With two images saved, the processor proceeds to step S623 and begins the sub-process to determine using mathematical image registration algorithms where the center of $I_2^R$ is to be found within $I_1$. In this general embodiment this image registration algorithm follows the flow of FIG. 7.

Figure 7:
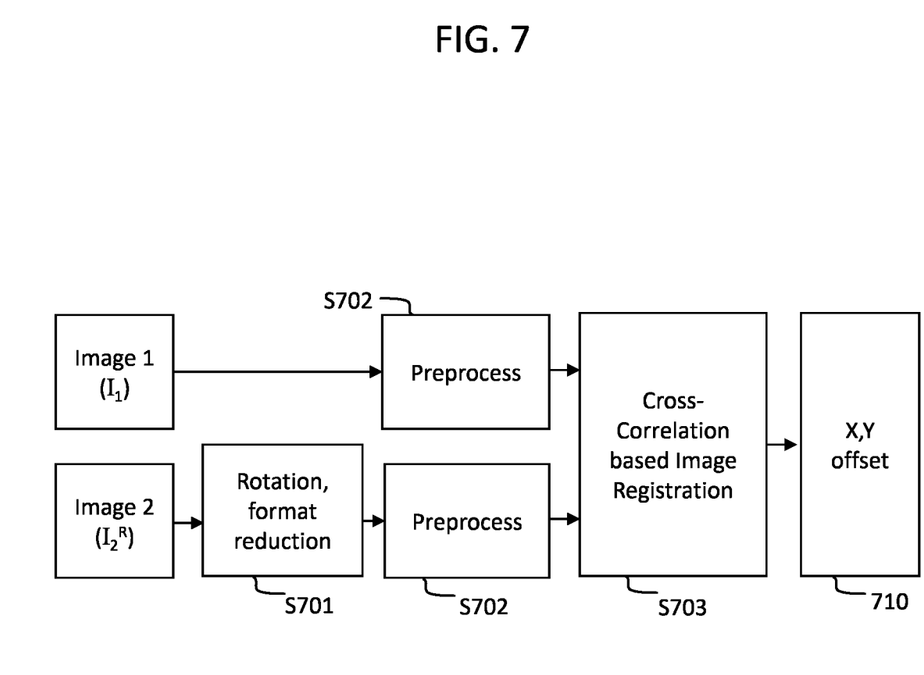
FIG. 7 is a flowchart of the image registration process of the aimpoint correction method.

In step S701 of FIG. 7, the processor rotates $I_2^R$ imagery data about its center, based on the difference in the orientation data creating the rotation-corrected image $I_2$. This step inherently also windows the image, reducing the image frame size about the center, nominally at a maximum by a factor of the square root of 2, to allow for a 45 degree rotation. Imagery data may be pre-processed for image enhancement in step S702, which may include normalization, histogram equalization, de-histogram, gradient detection, gradient amplification, gaussian smoothing, noise reduction, or other processing steps known to those knowledgeable in the art. (For the post-shot imagery data, preprocessing steps of S702 may be swapped with rotation and format reduction of step S701, or may be applied before saving the imagery to memory.)

The processor 203 then runs a cross-correlation type image registration algorithm S703 to find the center of $I_2$ in $I_1$. Cross-correlation is a technique used in image registration to find the spatial displacement or transformation between two images. Cross-correlation type registration methods are conducted by a series of steps: of defining a search area, using a slide window (also known as a 'template' or 'patch') to traverse the search area of the target image, and at each position of the sliding window calculating the sum of the differences between the between the pixel values of the sliding window and the corresponding region of the reference image.

Figure 8:
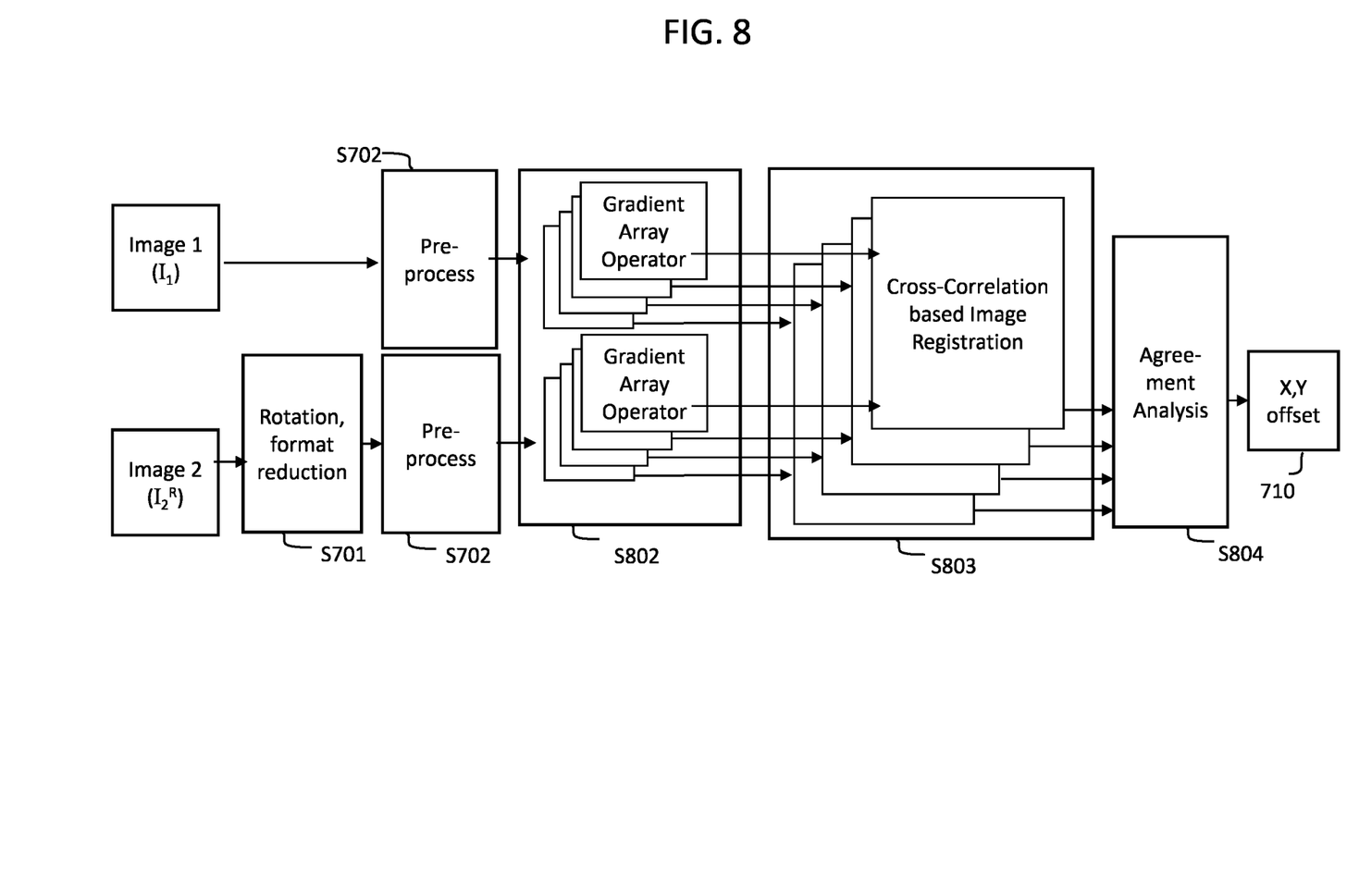
FIG. 8 is a flowchart of the preferred image registration process of the aimpoint correction method, featuring application of a gradient array operator and prior to image registration.

The cross-correlation type methods of step S703 (or S803 which will be covered later) may take the form of Sum of Absolute Difference ("SAD", Eq. 1), Normalized Sum of Squared Differences ("NSSD", Eq. 2), or Normalized Cross Correlation ("NCC", Eq. 3) or other similar in mathematical nature. These and other cross-correlation based algorithms for image registration (e.g., zero-mean SAD, zero-mean sum of squared differences, etc.) are known to those knowledgeable in the science of image processing and statistics.

$$NSAD(u, v) = \frac{1}{xy}\sum_{x,y}|I_1(u, v) - I_2(x-u, y-v)| \qquad \text{Eq. 1}$$

$$NSSD(u, v) = \frac{1}{xy}\sum_{x,y}(I_1(u, v) - I_2(x-u, y-v))^2 \qquad \text{Eq. 2}$$

$$NCC(u, v) = \frac{\sum_{x,y}[I_1(x, y) - avg(I_1, u, v)][I_2(x-u, y-v) - avg(I_2)]}{sqrt\left\{\sum_{x,y}[I_1(x, y) - avg(I_1, u, v)]^2 \sum_{x,y}[I_2(x-u, y-v) - avg(I_2)]^2\right\}} \qquad \text{Eq. 3}$$

In Eq. 1 and Eq 2. the division by (1/x y) is a division of the number of pixels of the being summed at each slide position. In Eq. 3 avg($I_1$, u, v) is the average of the $I_1$ image under the $I_2$ template, and avg($I_2$) is the average of the entire template.

All the equations Eq.'s 1, 2, and 3 output an array, the extreme value of which (maximum or minimum, depending on the algorithm) indicates a point where two images have highest correlation. Optimally, the entire output array need not be saved to memory as each element of the output array is calculated; only the extremum or a plurality of extrema need to be retained in memory.

In the preferred embodiment, the cross-correlation algorithm is a Normalized Sum of Absolute Differences ("NSAD") (Eq. 1), with an added feature that elements at or near the center of $I_2$ (the point of impact) are excluded from the summation. The minimum of the NSAD output array reveals the best choice for where the centroid of $I_2$ is to be found in $I_1$.

A validation step, captured in FIG. 5 as S624, checks the results of the cross-correlation function (NSAD, in this case), based on a threshold of the minima NSAD value and an examination of the ratios of multiple minima of the NSAD array, and the output of this validation check directs the switch captured in flowchart as S624. If the results pass validation, the reticle is adjusted by the "x,y offset" 710, and results are stored in non-volatile memory 204 and/or cached processor memory in the process step S631 and the process of the aimpoint correction method is complete. If results do not pass validation, the process is aborted in S641. Here and elsewhere, "x,y offset" refers to offsets in the x- and y-Cartesian coordinate system.

Figure 1:
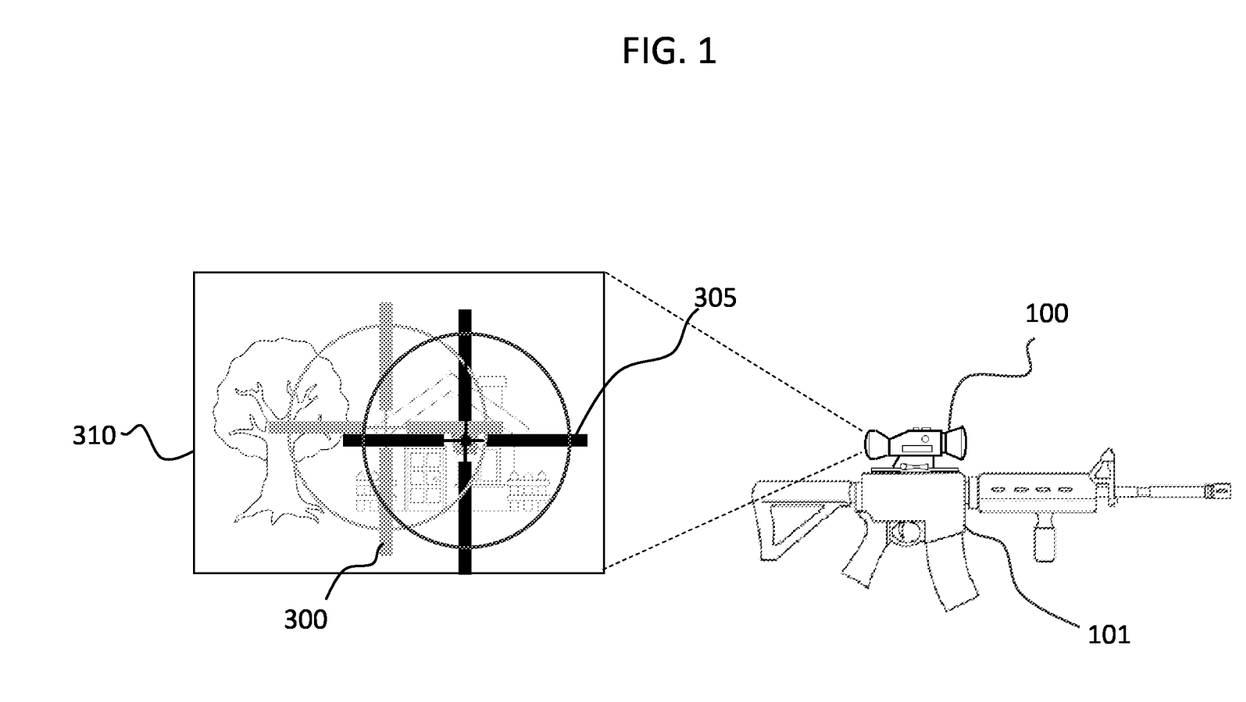
FIG. 1 is an image of a digital weapon sight mounted to a weapon (a rifle), and a notional exemplary image of the correction of a digitally overlayed reticle.
Figure 3D:
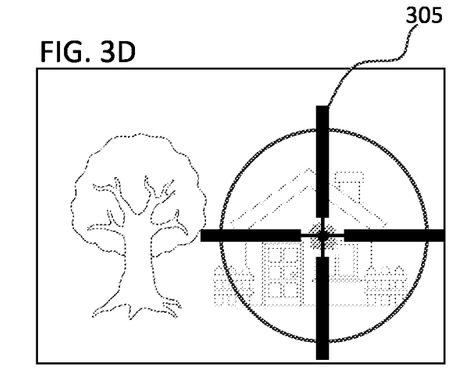

Upon successful completion, imagery displayed to user is shown in FIG. 3D, where the reticle 300, originally centered in the imagery, has been moved to a new position, and what is displayed is now an "adjusted reticle" 305, and will more precisely indicate location of the point of impact of subsequent shooting. This is also illustrated in FIG. 1, which in 310 is a notional image showing the effect of the aimpoint correction with the initial reticle 300, grayed out for illustrative clarity, the adjusted reticle 305, and the "x,y offset" 710.

Embodiment 2—Application of the Gradient Array Operator

In this embodiment, the process flows in the same manner as the previous embodiment, in that the user takes aim, takes a shot, and then takes aim at the point of impact, according to the process captured in FIG. 5.

However, in this embodiment the image registration algorithm in step S623 follows the specific flow of FIG. 8 with processing steps for improved image registration reliability. All imagery data is processed in step S802 with a "Gradient Array Operator," which is an array of first and/or second order partial derivatives of the imagery data, or absolute values thereof, and/or the raw imagery data, and which outputs a set of imagery data seen in FIG. 8 as four arrows emanating from the Gradient Array Operator box in S802.

Figure 9:
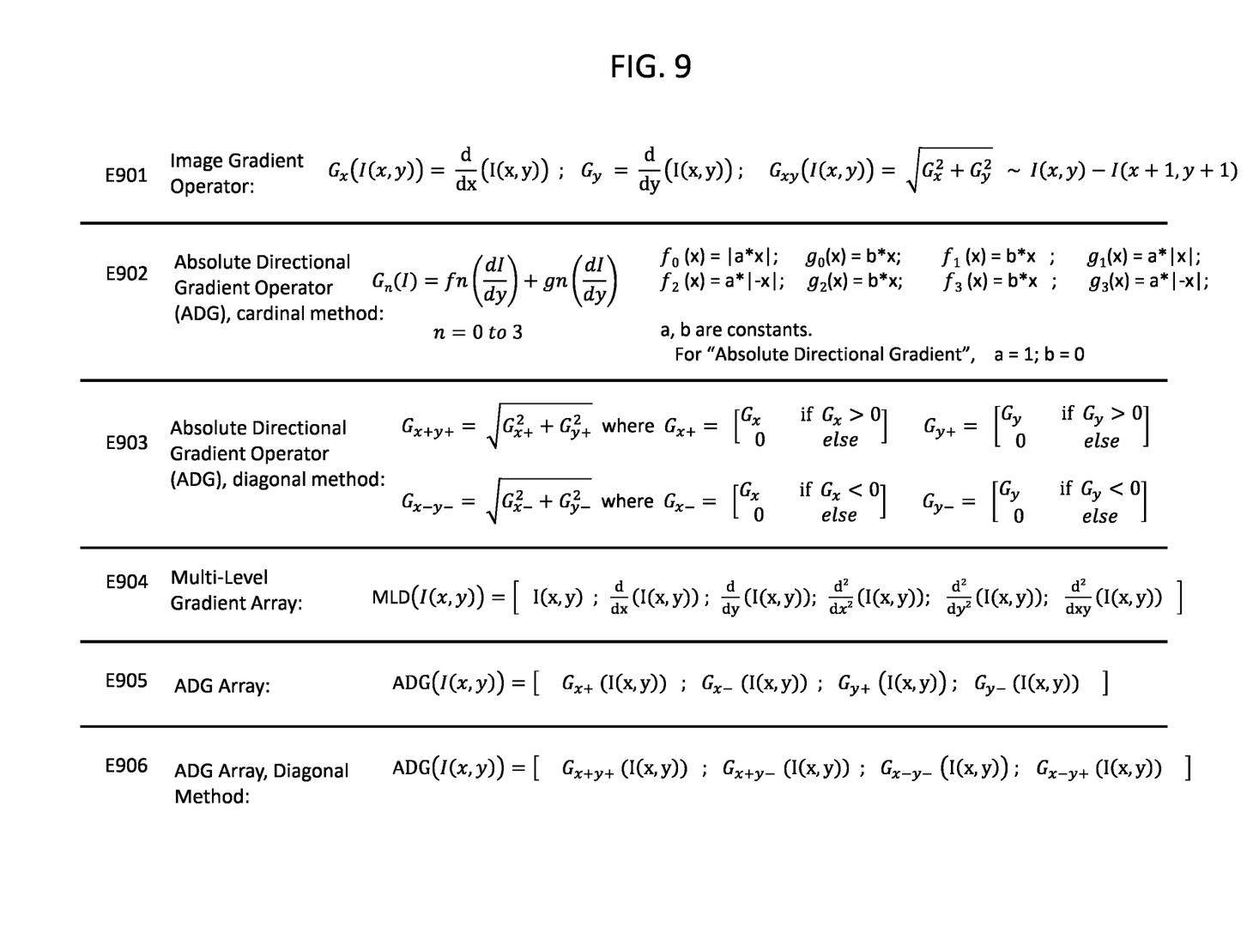
FIG. 9 shows equations used for application of gradient array operator.

FIG. 9 shows the basic gradient equations, as a derivative of the image in either the x or y direction, in E901. From this point, we can create a "Absolute Directional Gradient Operator" E902, which is a linear combination of the partial derivatives in the x- and y-direction, but subject to an absolute value. In the case that the coefficients a and b of the linear combination are set to a=1 & b=0, the result is all positive gradients in the x-direction, and set all other values to zero. Per E903, we see a similar absolute gradient, but this time in a diagonal direction (as opposed to x-,y-cardinal directions).

The Gradient Array Operator is thus an array of multiple types or orders of gradient operators: x-direction, y-direction, second order derivative, absolute value of the first order derivative, etc. Examples can be found in E904, E905, E906, all of which can be considered as a Gradient Array Operator. In E904, the initial image plus five different derivates constitute a "Multi-Level Gradient Array". Between E905 and E906, all orientations of the Absolute Gradient Operator E902 are found; E906 is fundamentally equivalent to E905, rotated 45 degrees. In the preferred embodiment, the Gradient Array Operator takes the form of E906, the Diagonal Method of the ADG Array.

Turning back to FIG. 8, from one image, the Gradient Array Operator produces a multiple of processed images, which are sent to a cross-correlation based image registration algorithm (NSAD, Eq. 1), represented in S803 as four blocks of cross-correlation registration.

It is optimal for speed and memory to concatenate each pixel of the four outputs of the Gradient Array Operator in S802 to a single data element, and then run the image registration algorithm a single time as opposed to the four registration blocks represented in S803. With this optimization, in each internal step of the summations the single data element is deconstructed into four elements and independent sums are run on those. This optimization is not shown in FIG. 8, for figure clarity.

The x,y locations of the four minima of each NSAD algorithm are then put through an agreement analysis step S804 that groups and averages the "agreeing results" together and discards erroneous results, and then the number of "agreeing results" is fed to step S624.

Figure 10:
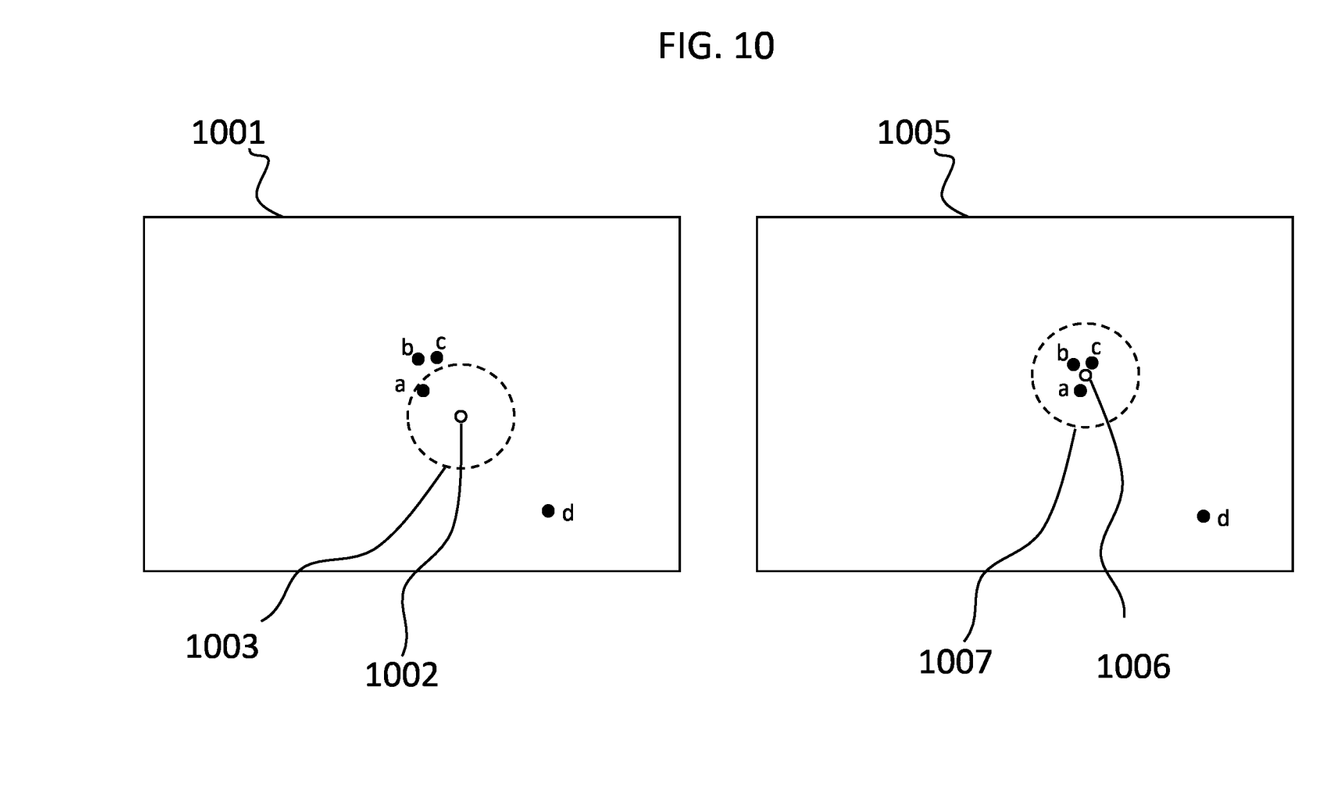
FIG. 10 is two exemplary images of logically grouping of four image registration results produced in the process of the preferred embodiment of the aimpoint correction method with a Gradient Array Operator applied.

To expand on step S804, refer to FIG. 10, where 1001 and 1005 both illustrate a possible set of outputs (x,y locations of NSAD minima) from S803, labeled a,b,c,d. In 1001, the radius 1003 centered at the average point 1002 of all four points contains only one point; in 1005, the same size radius 1007 centered at 1006, which is the average of points a, b, and c contains a,b,c—the removal of point d reveals that a, b, and c "agree" with each other. In this case, three results "agree." Thusly, "agreeing results" are those that occur within a certain distance of each other or within a certain distance of common point. From logically grouping and averaging these, the "x,y offset" 710 determined, the image registration is complete, and the process proceeds to S624, where the validation check in this embodiment relies on the number of agreeing results.

If the number of agreeing results is not sufficient—for a Gradient Array Operator of type E906 this is number is three—then the process proceeds to step S641 and the process aborts with a failure.

If the number of agreeing results is sufficient, then the process proceeds to step S631, where results are stored in non-volatile memory 204 and the reticle display 300 is adjusted to indicate the subsequent point of impact. At this stage, imagery displayed to user is shown in FIG. 3D, where the reticle 300, originally centered in the imagery, has been moved to a new position, and what is displayed is now an "adjusted reticle" 305.

Embodiment 3—Automatic Post-Shot Capture

In another embodiment of the aimpoint correction method, the user does not aim at the point of impact as at S621. Instead, the processer 203 calculates the point of impact algorithmically by capturing the post-shot imagery data $I_2^R$ (when the weapon sight is appropriately steady, per the ballistic event and orientation sensor 207), rotating $I_2^R$ to create $I_2$, and then determining where the center of $I_2$ is found in $I_1$, resulting with an "x,y offset" 710. Then $I_2$ and $I_1$ are both windowed based on "x,y offset" 710 to cover only common elements, then an absolute value subtraction is conducted according to Eq. 4 between windowed $I_1$ and $I_2$ to determine the absolute difference of images (ADI). This reveals an image where the point of impact can be determined by finding the centroid of the region of peak value. The processor 203 then conducts a verification step to verify that the peak exists, is not too large, and no other peaks exist.

$$ADI(x, y) = |I_1(x, y) - I_2(x, y)| \quad \text{Eq. 4}$$

Figure 6:
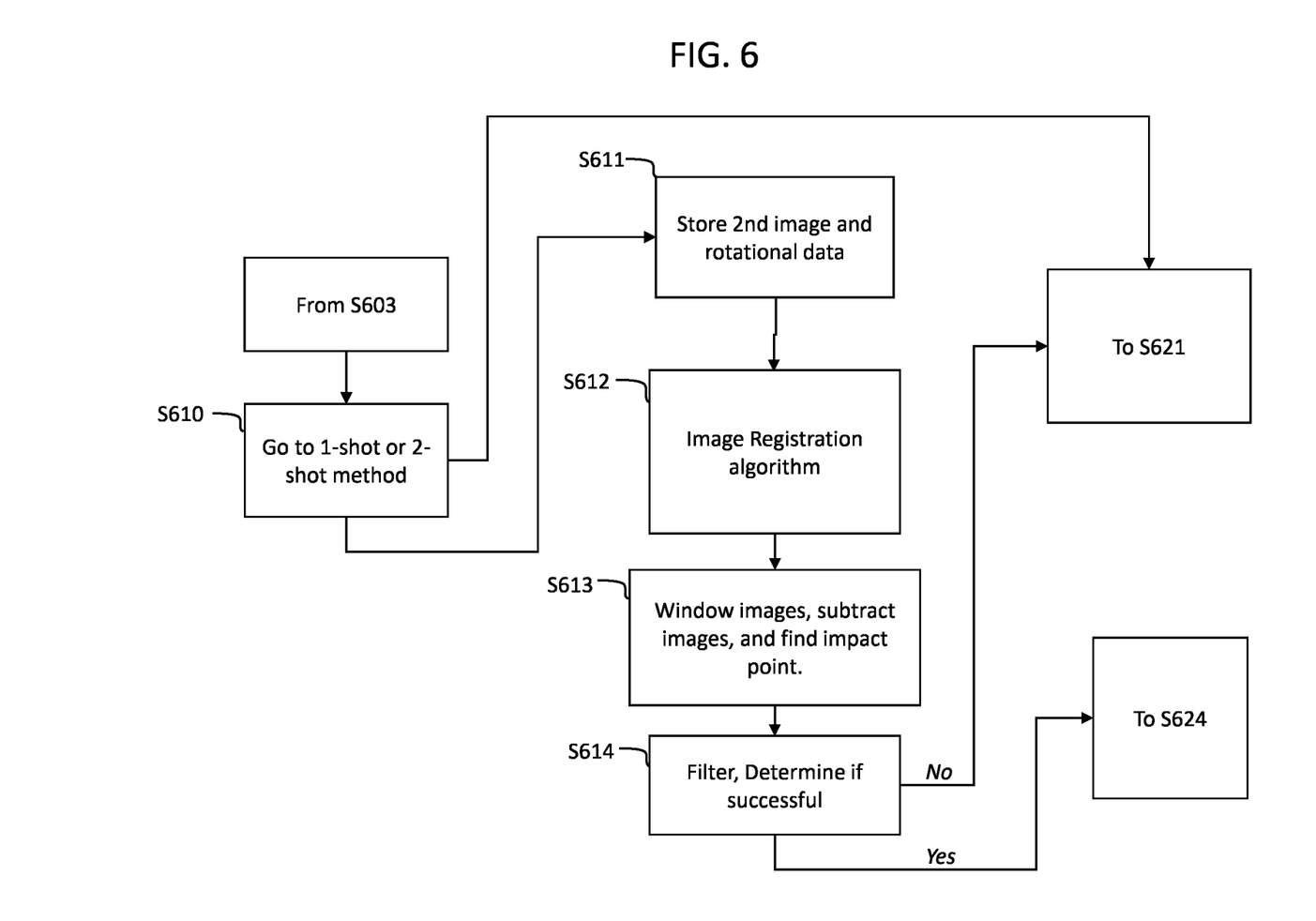
FIG. 6 is a flowchart of an embodiment of the aimpoint correction method where the point of impact is determined algorithmically.

The method follows steps outlined in FIG. 6, which refers to steps in FIG. 5, and exemplary images of this process are captured in FIG. 4. Note that these are images as captured by the processor 203 and stored to memory, and thus are not presented with reticle overlays.

The process flow follows the process steps S601-S602-S603, but then, according to FIG. 6, adds a switch at S610, and instead of following the previously defined process, it goes to S611 where the post-shot image is captured, then to S612 where the image registration is conducted. The same method (as previous embodiment) of Gradient Array Operator preprocessing and cross-correlation function (NSAD, Eq 1) are again employed.

Figure 4A:
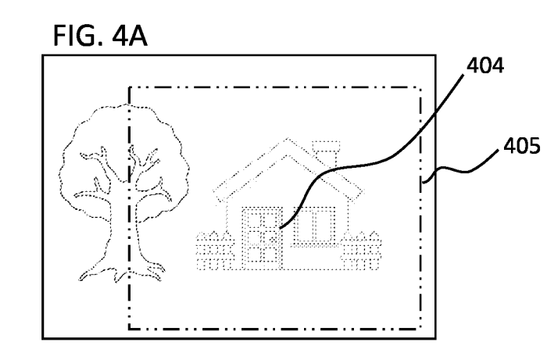
FIG. 4 is a set of exemplary images captured, windowed, and exemplary image of image subtraction, during steps of an embodiment of the aimpoint correction method where the point of impact is determined algorithmically.
Figure 4B:
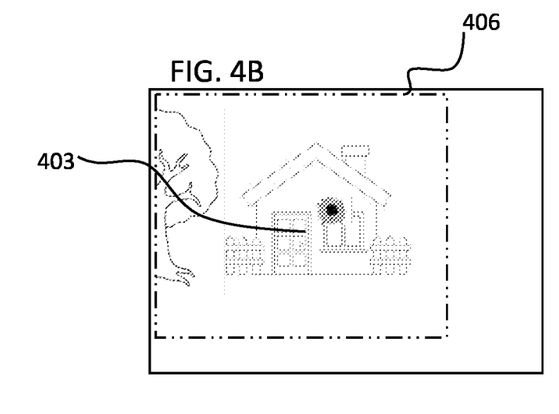
Figure 4C:
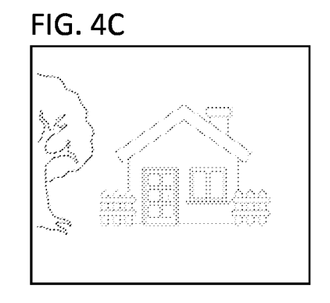
Figure 4D:
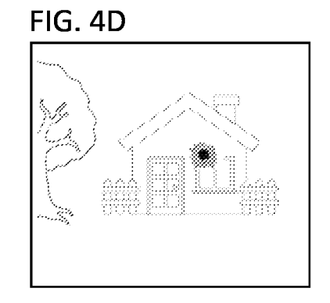

FIG. 4A shows the pre-shot image, $I_1$, as captured by the processor 203. FIG. 4B shows $I_2$, the image captured after a shot, and its center shown as 403. The processor 203, and then conducts the image registration algorithm (FIG. 7 or FIG. 8) to find where the center point of $I_2$ (shown by 403) is in $I_1$ (shown by 404). In step S613 each image is windowed to an area covering common pixels: the window on $I_1$ is 405 and the window on $I_2$ is 406. The resulting images are FIG. 4C (windowed version of FIG. 4A) and FIG. 4D (windowed, rotated version of FIG. 4B). The processor 203 then determines the absolute difference of the images via Eq. 4, producing the difference array (ADI) between FIGS. 4C and 4D, illustrated notionally in FIG. 4E, in which one case see the point of impact and a lot of noise. Noise filtering may then be employed to suppress peaks in the difference. Finally, a validation check is employed in step S614, and the bullet location is ascribed to the location of the ADI array that passes acceptance criteria of peak value (as ratio to other local maxima), size of peak region, and peak edge containment. The "containment" criterion is meant to guarantee that the peak is not too large and does not smear, and is based on a radius 410 applied to all significant peak values of the difference array FIG. 4E to verify the values from the peak to the edge of 410 fall to below a threshold and/or are not continuous from peak to radius 410 edge. If values at the edge of 410 are larger than the threshold and extend through 410 (see 411), then that peak will not be considered "contained"; if all peaks violate containment, the process reverts to the previously mentioned process to step S621 of FIG. 5 where the user aims at the point of impact. This method is less reliable and requires a fallback.

Figure 4E:
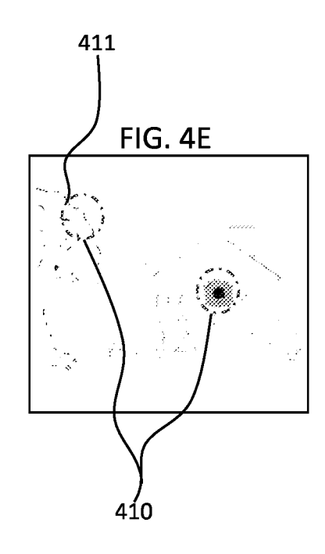

Important preprocessing steps (see S702, FIG. 7 and FIG. 8) used in the method include gaussian blurring (known to those knowledgeable in image processing), to reduce the noise seen in FIG. 4E, caused by movement of objects in the scene and inaccuracy of the image registration function, and which is illustrated in FIG. 4E. In that image, the containment radius 410 is shown at two locations; 411 shows a point where shows the containment requirement is violated, showing both the limitations of the process and the importance of filtering the output with a Gaussian blurring process implemented in as a part of S702.

C. Variations and Optimizations of Abovementioned Embodiments

Other variations, optimizations, or enhancements are nearly limitless, but it is valuable to mention a few:

These preferred embodiments may use a method of iterative solutions to increase speed of calculations, wherein the "binning," or averaging clusters of adjacent pixels, is employed prior to registration algorithm. This reduces image resolution, and therefore memory size and process time. For example, in a 640×480 sensor, the preferred bin is 8×8, reducing the entire image size by a factor of 64. In such an embodiment, parts of the image registration algorithm of FIG. 7 (step S704) or FIG. 8 (steps S803 and S804) are run a plurality of times (preferred: two) at different levels of resolution. A coarse-resolution image registration of the entire imagery array precedes a fine-resolution image registration step, the latter conducted only over a windowed region of interest, the center of which is the result of the coarse-resolution registration step.

In an embodiment, the method may be implemented in a manner such that the user fires a plurality of shots while aiming at the same specific point, then aims at the apparent centroid of the cluster (in step S621, FIG. 5). In another embodiment, an additional step of S632 (see FIG. 5) may be added to allow the user to repeat the steps to repeat and refine the output of the aimpoint correction method. In this embodiment, if the second image capture is prompted by a ballistic sensor event indication, initiating the isolation of $I_2$, $I_2$ may become the new $I_1$, and then the processor 203 retrieves a new $I_2$ according to FIG. 5. Effectively, from the user's point of view, it would be like "chasing" the point of impact as the user keeps aiming and shooting at the previous shot's point of impact until aimpoint deviation is sufficiently corrected.

In embodiments, the validation step of S624 may be further comprised of an absolute difference of windowed subregions of $I_1$ and $I_2$ (Eq 4), where $I_2$ has been windowed to only cover $I_1$ elements and $I_1$ is windowed to be centered on $I_2$. Both these windowing steps are based on the "x,y offset" 710. The absolute difference of $I_1$ and $I_2$ will peak in the center, indicating that $I_2$ was correctly pointed at the point of impact, which is where $I_1$ and $I_2$ are maximally differing, and therefore acts as a validation step.

Embodiments may include under-sampling the image sensor, and shifting the "active window" of the sensor. For example, an image sensor of 1400×1200 pixels may be sampled over an "active window" of 1280×960 pixels, which are displayed to the user. In this case, an alternative to adjusting the position of the reticle 300, is to adjust the position of the active window of the sensor. This is advantageous as it keeps the reticle overlay in or about the center of the imagery seen by the user. If the "x,y offset" 710 is too large, both active window adjustment and reticle adjustment may be employed.

Alternative embodiments may use the aimpoint correction in an "always on" manner that constantly corrects shooting, as the speed enhancements may allow. The method may be employed in a system further equipped with a laser range finder, to create a more precise aimpoint for any distance. In such an embodiment, a laser range finder in communication with the processor is added to the system, via wired or wireless connection, and the process is run a plurality of times at various distances, and the aimpoint correction factor ("x,y offset" 710) as well as distance are stored in memory for each distance. The processor can then determine precise aimpoint for any range the range finder reports via interpolation and automatically adjust the reticle accordingly.

It is also preferred that symbology (graphic symbols and icons) be placed over the imagery to assist the user in the process. This is not limited to instructions; should an IMU be used in place of the ballistic event and orientation sensor 207, the processor 203 may employ thresholds to the capturing of the post-shot image $I_2$: that it be within field of view of the first shot, and that the weapon sight be held sufficiently steady to get a clear image. These and other user benefits are important for implementation of the method, but are not meant to limit the claims herein, as their number and variation are limitless.

What is claimed is:

1. An aimpoint correction method, which is applied to a digital weapon sight the digital weapon sight comprising a housing, a lens, a digital image sensor, a digital processor, addressable digital memory, a ballistic event and orientation sensor, an imagery output mechanism, and a manner of affixing to a weapon, wherein the method is characterized by comprising the following steps:
   storing pre-shot imagery and orientation data in the digital memory;
   sensing the occurrence of at least one ballistic event;
   storing post-shot imagery and orientation data in the digital memory;
   computing the two-dimensional coordinates of the centroid of the post-shot image as found within the pre-shot image by performing a cross-correlation type image registration function;
   and shifting an overlayed reticle symbol, and/or shifting the image sensor active window, according to the two-dimensional coordinates to correct subsequent aiming.

2. The method according to claim 1, wherein
   imagery data is processed by an operator array comprising first or second order partial derivatives or absolute values thereof, or combination of first and second order partial derivatives or absolute values thereof, and
   the cross-correlation type image registration function produces a set of two-dimensional coordinates, one for each partial derivative function in the operator array, and
   the method further comprises a step of logically analyzing these sets of two-dimensional coordinates to produce the aimpoint correction.

3. The method according to claim 1, further comprising of steps of
   performing a pixel-level subtraction of pre-shot and post-shot imagery data;
   logically analyzing the values of the pixel-level subtraction to determine the location of the point of impact of a projectile.

4. The method according to claim 1, further comprising: applying a rotation of the post-shot imagery data prior, and based on data from the ballistic event and orientation sensor.

5. The method according to claim 1, further comprising: binning of imagery data by grouping and averaging clusters of neighboring pixels to reduce array size prior to performing image processing and registration functions; storing results of registration function performed on binned data as a region of interest; and repeating the image registration function with higher resolution imagery data over a smaller two-dimensional region of interest.

* * * * *